J. P. REILY & J. B. NOYES.
SECTIONAL LETTER AND DESIGN.
APPLICATION FILED MAR. 10, 1908.
972,406.
Patented Oct. 11, 1910.
3 SHEETS—SHEET 1.
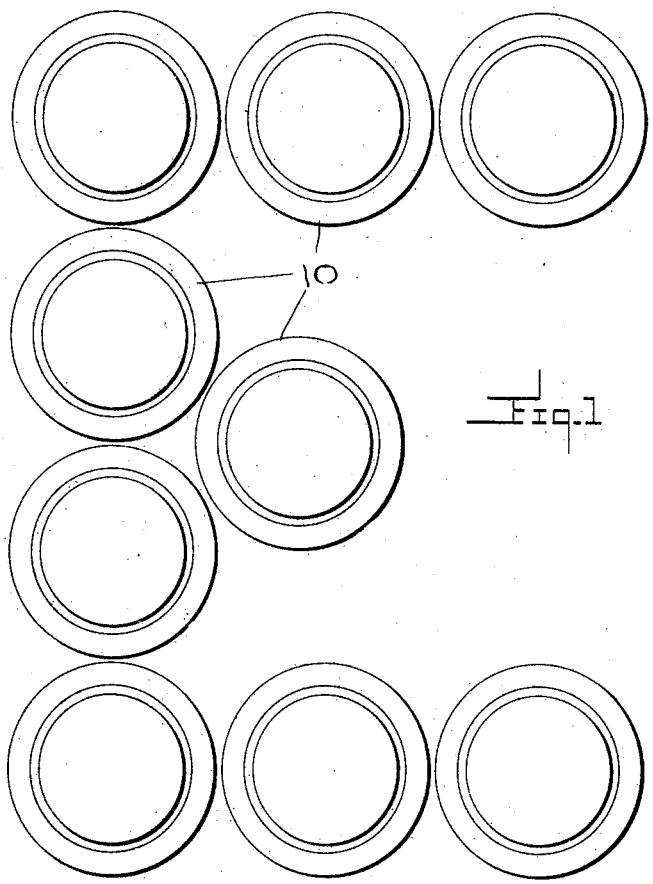
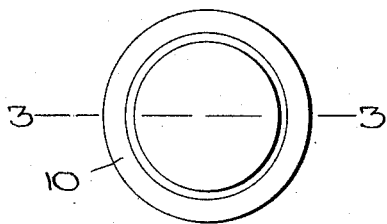
Witnesses
Edwin P. Lusby
E. L. Chandler
Inventors
John P. Reily
John B. Noyes.
By Woodward & Chandlee
Attorney J. P. REILY & J. B. NOYES.
SECTIONAL LETTER AND DESIGN.
APPLICATION FILED MAR. 10, 1908.
972,406.
Patented Oct. 11, 1910.
3 SHEETS—SHEET 2.
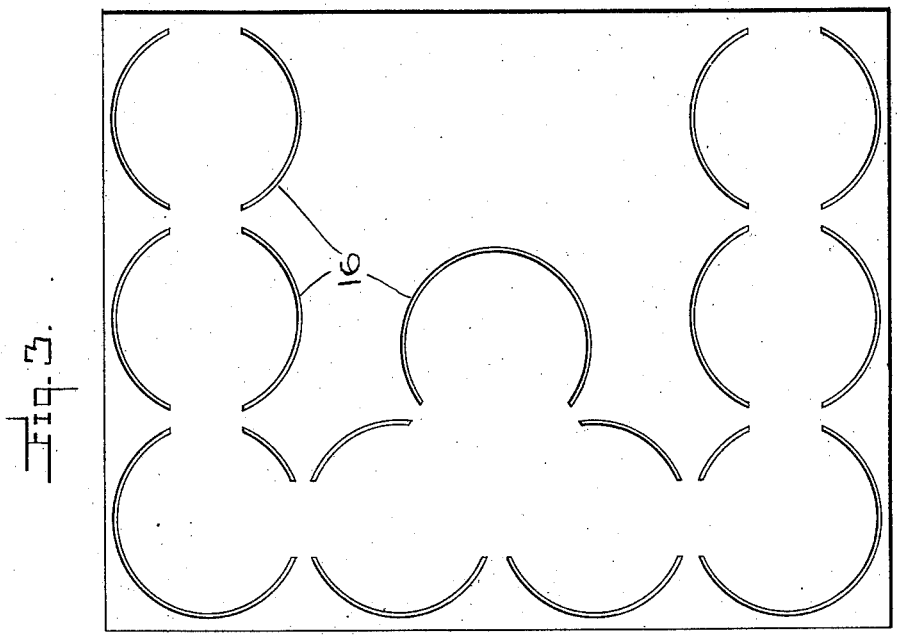
Witnesses
Edwin R. Lusby
E. L. Chandlee
Inventors
John P. Reily 2nd
John B. Noyes.
By Woodward & Chandlee
Attorneys

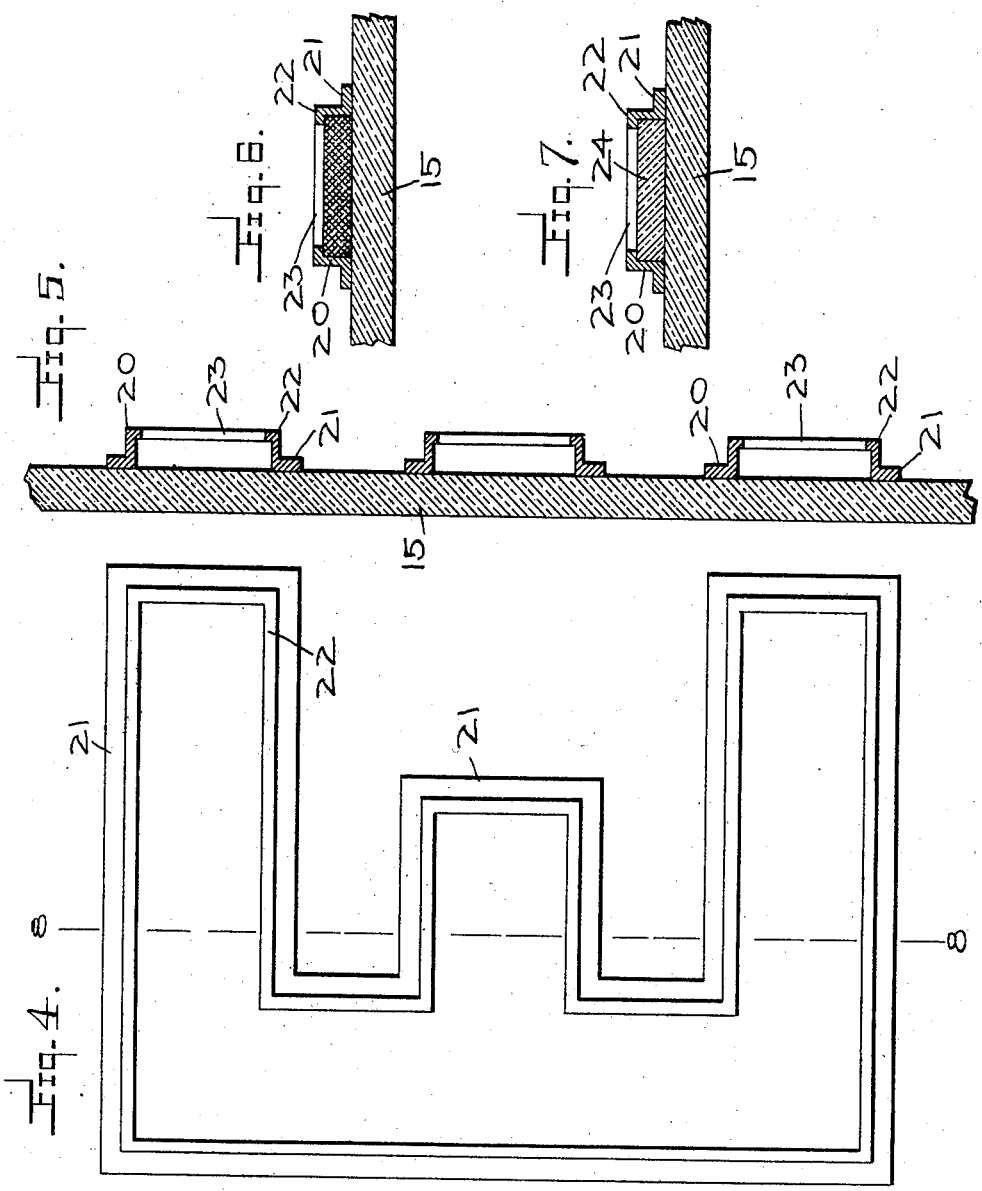

UNITED STATES PATENT OFFICE.

JOHN P. REILY AND JOHN B. NOYES, OF ST. LOUIS, MISSOURI.

SECTIONAL LETTER AND DESIGN.

972,406.  Specification of Letters Patent.  Patented Oct. 11, 1910.

Application filed March 10, 1908. Serial No. 420,172.

*To all whom it may concern:*

Be it known that we, JOHN P. REILY and JOHN B. NOYES, citizens of the United States, residing at St. Louis, State of Missouri, have invented certain new and useful Improvements in Sectional Letters and Designs, of which the following is a specification.

This invention relates to sectional designs, and more particularly to designs arranged to be secured upon glass or other suitable base, and has for its object to provide means for effective combination of lines and color, the operation of which may be accomplished without the employment of skilled labor.

Another object is to provide a structure embodying any desired designs which may be secured upon glass without affecting the clearness or brilliance of the design.

Another object is to provide such an article which may be detached from its mounting when desired without injury to the design or mounting.

Another object is to provide a means for securing transparent letters or designs upon glass in a simple manner which will not affect the clearness of said design.

Other objects and advantages will be apparent from the following description, and it will be understood that changes in the specific structure shown and described may be made within the scope of the claim, and that any suitable materials may be used, without departing from the spirit of the invention.

In the drawings forming a portion of this specification and in which like numerals of reference indicate similar parts in the several views:—Figure 1 is a plan view of a letter made by the use of the present invention, Fig. 2 is a plan view of the retaining portion of one of the sections of such a letter, Fig. 3 is a plan view of a stencil blank for use in making designs, Fig. 4 is a plan view of a letter unit for use in transparent designs, Fig. 5 is a sectional view on the line 8—8 of Fig. 4 showing a transparent medium engaged with the unit, Fig. 6 is a sectional view showing an opaque blank engaged in a letter section, Fig. 7 is a view similar to Fig. 6 showing a transparent body engaged in the section.

Referring to the drawings, there are shown retaining members 20 for design sections; the central area of which is recessed as shown at 22. A body 24 is set in the recessed portion, to be held therein by adhesion. There is shown also a stencil blank intended for use as a pattern guide, and having a series of openings 16 therethrough conforming in shape with the sections 20, and arranged to be laid upon the surface upon which it is desired to attach the sections, and outlines marked upon the surface by means of a pencil or similar instrument moved within the opening, and in contact with the surface and the edges of the opening, for the guidance of the operator when securing the sections 20 in place. The outlines may also be made by the use of a dusting bag or other suitable means.

The retaining members 20 comprise a contact flange 21 and an engaging flange 22, recessed below the flange 21, the retaining member having an opening 23 therethrough conforming to the shape of the section. A transparent or opaque blank 24 is set upon the flange 22, and held thereto by adhesion. It will be understood that the retaining members and portions for engagement therein may be made of any shape, or material which is desirable.

In use, for placing a design upon the inner side of a transparent base, to be viewed from the opposite side, the flanges 21 are treated with an adhesive and a body of the desired color, shape and material is disposed in the recessed portions. The flanges 21 are then engaged against the surface upon which the desired design is to be fixed, by means of a suitable adhesive.

In the event that the design is to be viewed from the same side of the base that it is secured on, the sections are secured in the same manner above described.

It will be seen from the foregoing that a new and desirable means is provided for the formation of ornamental letters or designs, the application of which may be accomplished without special instruction or experience. It is further to be noted that in constructing a sign as shown and described, a very ornamental and legible one may be produced from the outside, and by properly arranging the sections within the retainer with some selection as to color, a very beautiful design may be produced from the opposite side of the glass to which the retainer is secured or forms a part thereof.

What is claimed is:—

The herein described device comprising a solid glass plate, a series of retainers secured to and projecting from one side of the plate, retaining circumscribing flanges forming a part of said retainers, outwardly extending annular flanges also forming a part of each of said retainers for securing the latter to the glass plate, and transparent sections located within the retainers so secured, whereby the design so constructed is legible and attractive on either side of the plate, said retainers, together with the transparent sections located therein, being properly arranged in respect to one another to form a suitable letter or other character without obstructing the light through the plate to which they are secured.

In testimony whereof we affix our signatures, in presence of two witnesses.

JOHN P. REILY.
JOHN B. NOYES.

Witnesses:
C. A. MONROE,
JOHN H. WILLMOD.